UNITED STATES PATENT OFFICE.

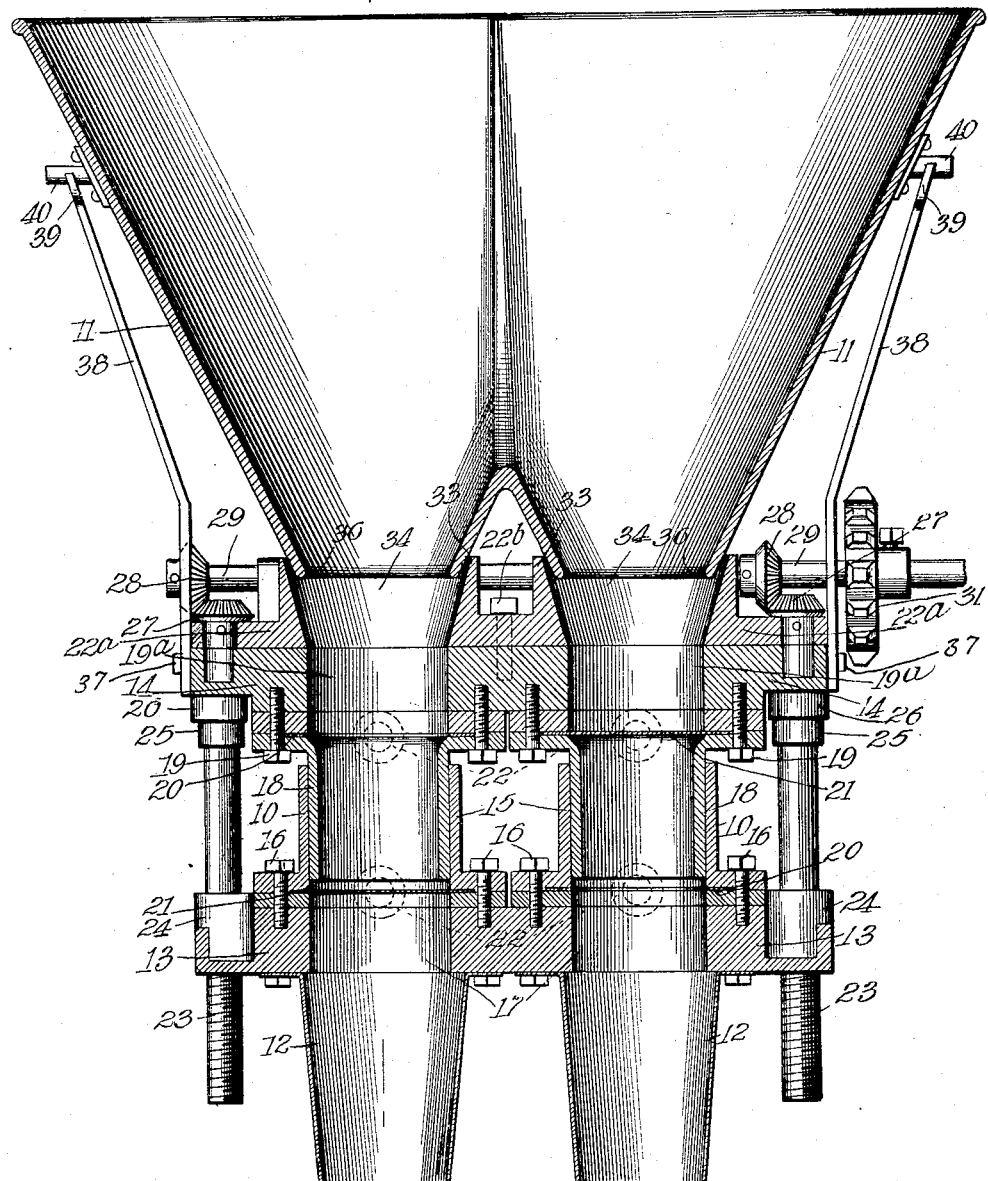

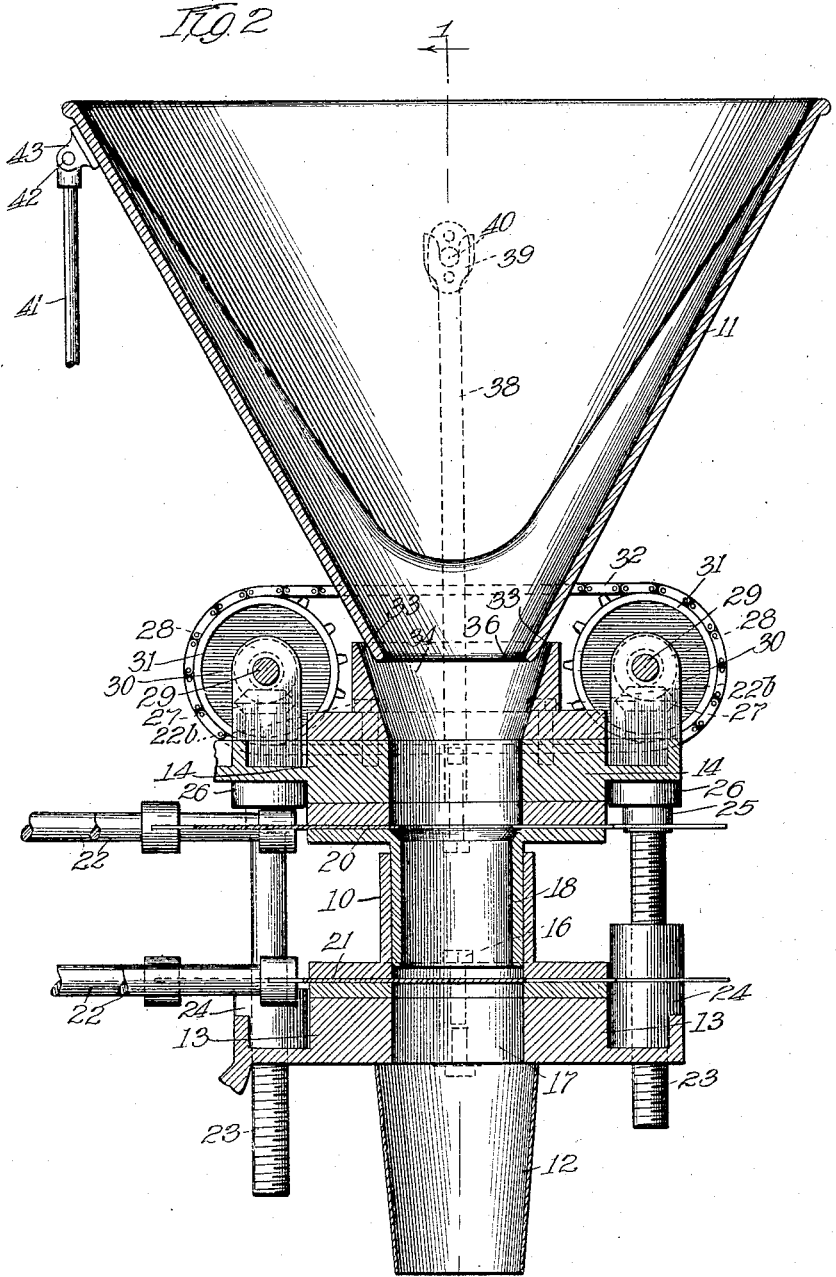

FRANK HAMACHEK, OF KEWAUNEE, WISCONSIN, ASSIGNOR TO SPRAGUE CANNING MACHINERY COMPANY, OF CHICAGO, ILLINOIS, A CORPORATION OF ILLINOIS.

FILLING-MACHINE.

1,197,821.  Specification of Letters Patent.  Patented Sept. 12, 1916.

Application filed March 13, 1915. Serial No. 14,213.

*To all whom it may concern:*

Be it known that I, FRANK HAMACHEK, a citizen of the United States, residing at Kewaunee, in the county of Kewaunee and State of Wisconsin, have invented new and useful Improvements in Filling-Machines, of which the following is a full, clear, concise, and exact description, reference being had to the accompanying drawing, forming a part of this specification.

My invention relates to filling machines, and, in its more specific aspect, to an improved oscillating hopper and measuring device adapted for use in canning machines for measuring and filling peas, beans or some similar substance which does not readily flow by gravity.

In the ordinary types of filling machines the substance to be measured clogs in the passages that lead to the measuring chamber and so causes uneven charging of the measuring chambers. This is overcome by my improvement.

In devices of this character as usually constructed it has been found necessary to provide an agitating device located within the hopper which would engage the material within the hopper directly to cause it to move down into the measuring device. This results in the material in the hopper becoming bruised and mashed, and this is particularly true in the case of peas and navy beans which are delicate, easily crushed, and for the filling of which there is an insistent demand for improved mechanism which will not damage the berries, it being very desirable that each individual berry retain its unmarred identity in the can of finished goods, as such undamaged goods commands a materially higher price in the market.

One of the objects of my invention is to provide improved means for agitating the material in the hopper which will not damage the material therein.

Further objects will appear from the detailed description to follow.

In the drawings, in which I have illustrated one embodiment of my invention—Figure 1 is a vertical axial section, on the line 1—1 of Fig. 2, of part of a filling machine embodying my invention showing the fixed and movable heads, and the mechanism for adjusting the movable head; and Fig. 2 is a section on the line 2—2 of Fig. 1, showing the relative position of the cut off slides for the measuring device.

Referring now to the drawing in detail the machine comprises a measuring device, indicated in general by reference character 10, a hopper 11 and discharge spouts 12 leading from the measuring device.

The measuring device 10 comprises a fixed head 13 and a movable head 14. Sleeves 15 are secured to the fixed head by means of cap screws 16. The fixed head 13 is provided with a pair of openings 17 therein leading from the sleeves 15 to the discharge spouts 12. A pair of sleeves 18 are secured to the movable head 14 by means of cap screws 19. These sleeves 18 telescopically engage the sleeves 15 on the fixed head. The movable head 14 is provided with a pair of openings 19$^a$ leading from the hopper 11 to the sleeves 18. Mounted in movable guideways 20 in the measuring device are four cut off slides 21, each of which is provided with a plunger 22 for actuating it. Suitable means (not shown) are provided for so actuating these cut off slides 21 that when the upper slide is open the corresponding lower slide will be closed, and vice versa, and so that when the upper right hand slide is closed the upper left hand slide will be opened, and vice versa. A throat member 22$^a$ is secured to the movable head 14 by means of cap screws 22$^b$.

The mechanism for adjusting the movable head with respect to the fixed head comprises screws 23, each having threaded engagement with a sleeve 24 formed integral with the fixed head 13 and provided with an enlarged portion 25 for engagement with a shoulder 26 formed integral with the movable head 14. Each screw extends upwardly through an opening in the movable head, and is provided at its upper end with a beveled gear 27 with which engages a beveled gear 28 keyed on a shaft 29 which extends across the machine and is mounted in bearings 30 formed integral with the throat member 22$^a$. Each of the shafts 29 has keyed thereon a sprocket wheel 31. These sprocket wheels are connected by a sprocket chain 32. The throat member 22$^a$ is provided with a pair of up-standing circular flanges 33 surrounding the openings 34 in the throat member leading from the hopper to the openings 19$^a$ in the movable head.

The hopper 11 is provided with a pair of discharge outlets 36 leading to the openings 34. It will be noted that the outside diameter of the discharge outlet 36 is slightly less than the corresponding inside diameter of the flanges 33 on the throat member, thus permitting some vibration of the hopper. Secured to the movable head 14 by means of cap screws 37 are a pair of standards 38 each having, at its upper end, a bifurcated portion 39 forming a bearing for a trunnion 40 secured to the side of the hopper 11.

The operation of my improved device and consequent action of the material in the hopper is as follows: The distance between the fixed and movable heads is adjusted to give the desired measurement between the upper and lower cut off slides by rotating one of the shafts 29 which will cause all of the screws 23 to be rotated by means of the sprocket chain 32, the sprocket wheels 31, the shafts 29 and the beveled gears 28 and 27. The hopper 11 is kept supplied with the material to be measured and transferred in any suitable manner. The cut-off slides 21 are actuated, as hereinbefore described, in such a manner that when the upper slide is opened the lower slide is closed, and vice versa. When the lower slide is closed and the upper one opened the material in the hopper falls down into the space within the sleeve 18 onto the lower slide. The upper slide is then automatically closed to cut off the hopper from the space below the upper slide, and the lower slide is then opened which allows the material within the sleeve 18 to fall through the opening 17 and into the discharge spout 12.

Due to the vibration of the machine occasioned by the reciprocation of the cut off slides and other causes, the hopper 11 is kept in a state of constant vibration due to the fact that it is supported by the standards 38 which are mounted on the machine, the loose fit of the outlets 36 in the flanges 33 permitting this vibration. The fact that the cut off slides reciprocate in a direction which is substantially perpendicular to the axis in which the hopper 11 is mounted to oscillate increases the tendency of the hopper to oscillate due to the reciprocation of the slides. As a result of the vibration of the hopper the material contained therein is loosened up and kept in a state of constant agitation so as to insure its feeding down through the outlets 36. The knocking of the outlets 36 against the flanges 33 as the hopper oscillates increases the agitation of the material in the hopper due to the resulting jar. It will be noted that this loosening and agitation of the material in the hopper is accomplished without the employment of a stirrer which would come in contact with the material in the hopper so that there is absolutely no tendency to bruise and crush the material in the hopper, the advantage of which has been previously pointed out.

In case the vibration of the machine, due to its ordinary operation, does not oscillate the hopper sufficiently to cause the necessary actuation of the material therein, special means for oscillating the hopper may be provided, such as a rod 41 reciprocated by any suitable means (not shown) pivotally connected at 42 to a bearing 43 secured to the hopper 11.

Having thus described my invention what I claim as new and desire to secure by Letters Patent is:—

1. In a filling machine, a device having a device having an upwardly extending throat portion and a pivoted hopper supported above the said device, said hopper having a depending discharge portion extending loosely into said throat portion and adapted to strike against said throat to loosen the material in the hopper and in the throat.

2. In a filling machine, a device having an upwardly extending throat portion and a pivoted hopper supported above the said device, said hopper having a depending discharge portion extending loosely into said throat portion and adapted to strike against said throat to loosen the material in the hopper and in the throat, and means to oscillate said hopper.

3. A filling machine including a hopper having a discharge spout, means for supporting said hopper for oscillation, and means surrounding said discharge spout and spaced therefrom for limiting the degree of oscillation of said hopper.

4. A filling machine including a hopper having a discharge spout, means for supporting said hopper for oscillation, and means located in the path of movement of said hopper against which said hopper strikes in oscillating for jarring the said hopper to loosen the material therein.

5. A filling machine including a hopper having a discharge spout, means for supporting said hopper for oscillation, means located in the path of movement of said hopper against which said hopper strikes in oscillating for jarring the said hopper to loosen the material therein, and means for oscillating said hopper.

In witness whereof, I have hereunto subscribed my name in the presence of two witnesses.

FRANK HAMACHEK.

Witnesses:
 MARGARET THIELEN,
 ANNE SOLOMON.